United States Patent [19]

Erickson

[11] Patent Number: 5,279,359

[45] Date of Patent: Jan. 18, 1994

[54] ROTARY TRISORPTION HEAT PUMP

[76] Inventor: Donald C. Erickson, 1704 S. Harbor La., Annapolis, Md. 21401

[21] Appl. No.: 905,284

[22] Filed: Jun. 26, 1992

[51] Int. Cl.$^5$ .............................................. F25B 17/04
[52] U.S. Cl. ................................ 165/104.12; 165/86; 62/478; 62/480
[58] Field of Search ............... 165/104.12, 86; 62/477, 62/478, 480

[56] References Cited

U.S. PATENT DOCUMENTS 4,574,874  3/1986  Duran .............................. 165/104.12
4,660,629  4/1987  Maier-Laxhuber ............ 165/104.12

OTHER PUBLICATIONS

K. H. Richter "Multi-Stage Absorption Refrigeration Systems" *Journal of Refrigeration* Sep./Oct. 1962, pp. 105-111.

J. C. V. Chinnappa, "Solar Operation of Ammonia-Water Multisty Air Condit. Cycles in Tropics", *Solar Energy* 1974 pp. 165-170.

Hans Stymme, "Chemical Heat Pumps", Swedish Council for Bldg. Research Summary 52:1982.

Uwe Rockenfeller et al, "Complex Compound Chemical Heat Pumps", Proceedings 9th IETC, Sep. 1987, Houston, pp. 158-164.

M. Lebrun et al, "Coefficients de Performance de Machines a Froid Monoetagees . . . " Proceedings XVIII Int'l Congr. Refrign., Montreal, 1991, p. 567.

K. Speidel et al, "Solar Cooling and Air Conditioning Process Using Chemical Reactions", Proceedings ISES, Denver, Aug. 1991, pp. 1601-1606.

*Primary Examiner*—Albert W. Davis, Jr.

[57] ABSTRACT

Apparatus and process are disclosed for sorption heat pumping at high efficiency in a smooth and continuous manner using a multiplicity of intermittent cycle triplex sorption modules. The hermetically sealed trisorption modules, each of which contains at least two solid sorbents, are free of pumps, valves, restrictors, or any similar devices for flow control of refrigerant or sorbent. The preferred refrigerant is ammonia and the preferred sorbents are the solid type with monovariant equilibrium, e.g., $BaCl_2$, $SrCl_2$, $CaCl_2$, $MnCl_2$, $FeCl_2$ and $SrBr_2$. The apparatus is preferably adapted for residential or small-scale commercial space-conditioning applications, and operates at double-effect efficiency in both the heating and cooling modes without inter-module heat transfer.

21 Claims, 5 Drawing Sheets

FIG. 2a
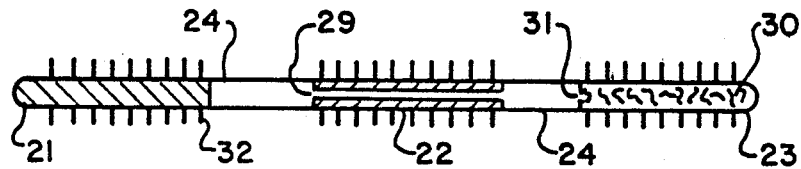
FIG. 2b
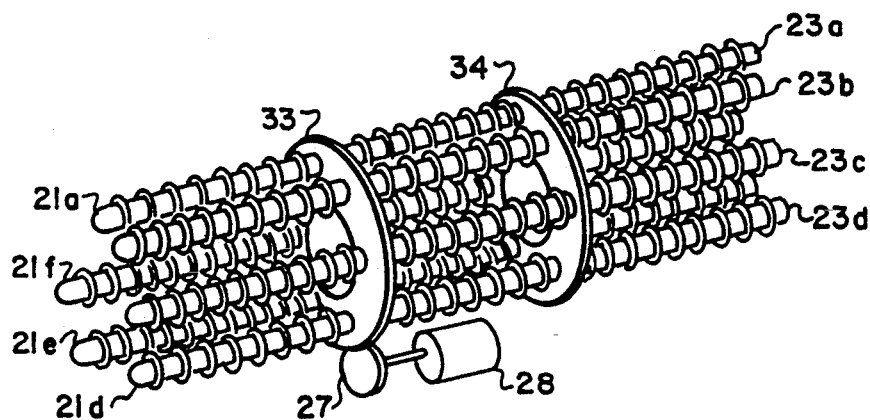
FIG. 2c      FIG. 2d      FIG. 2e
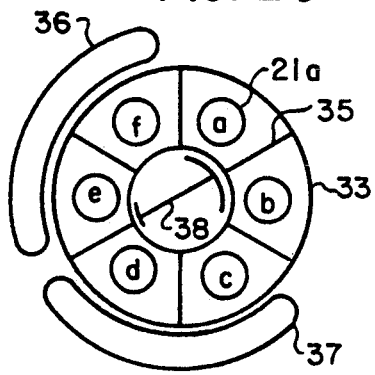 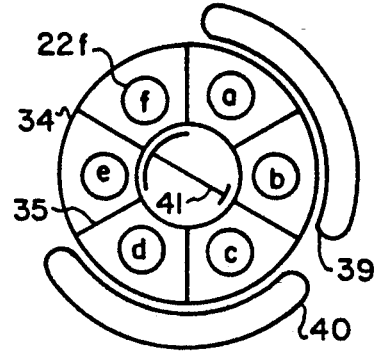 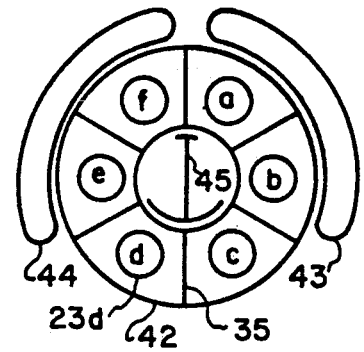
FIG. 2f
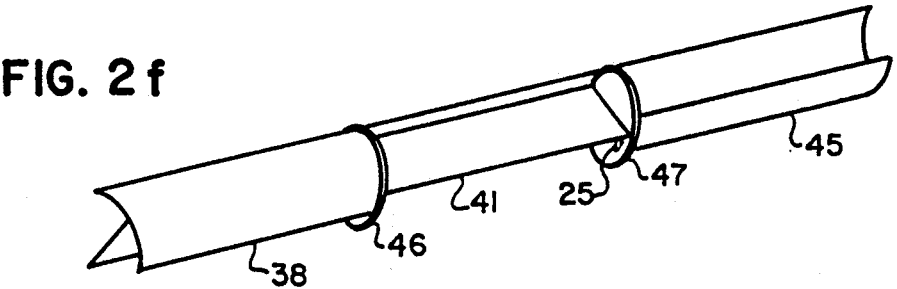

FIG. 3a
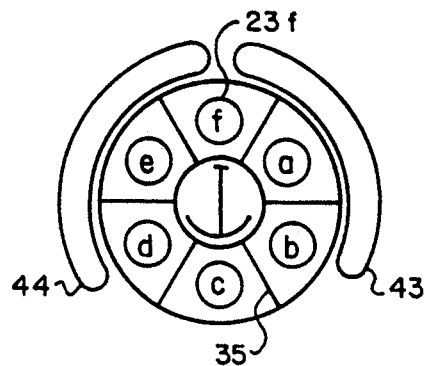
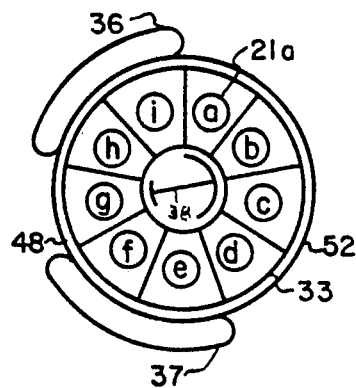
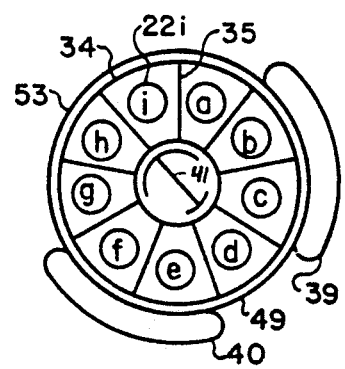
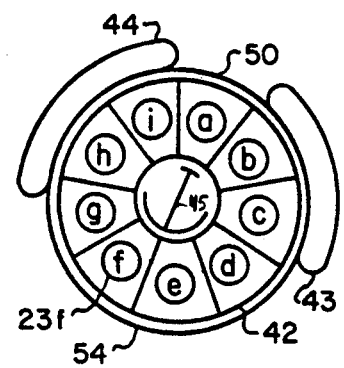
FIG. 3b  FIG. 3c  FIG. 3d

FIG. 5
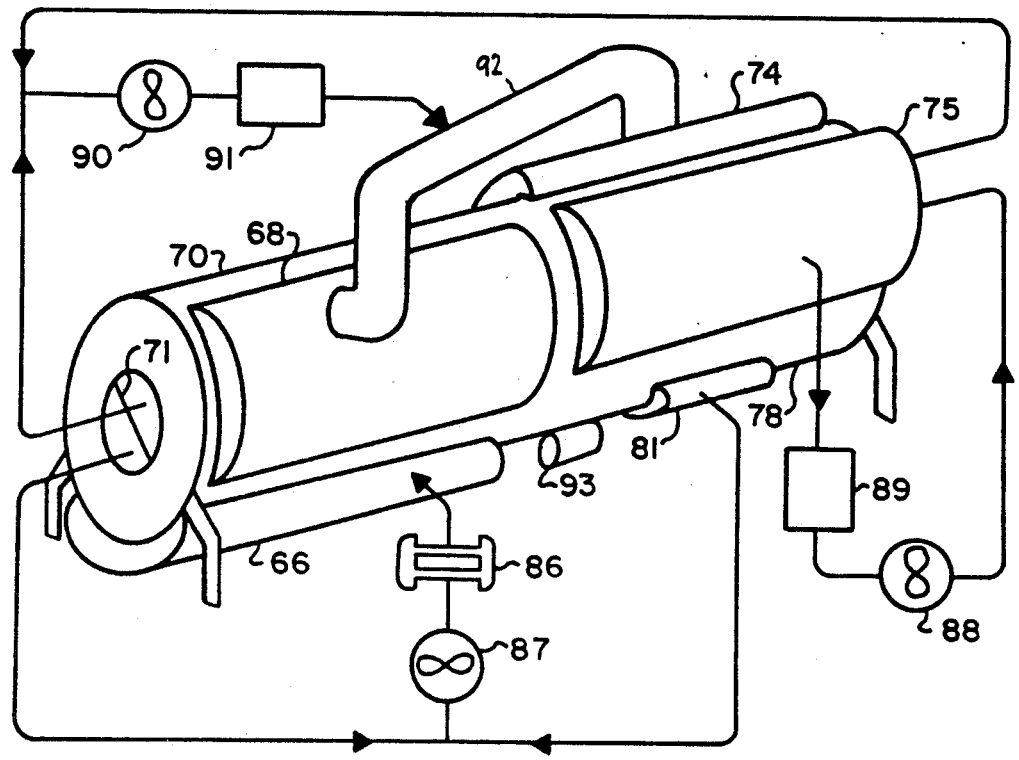
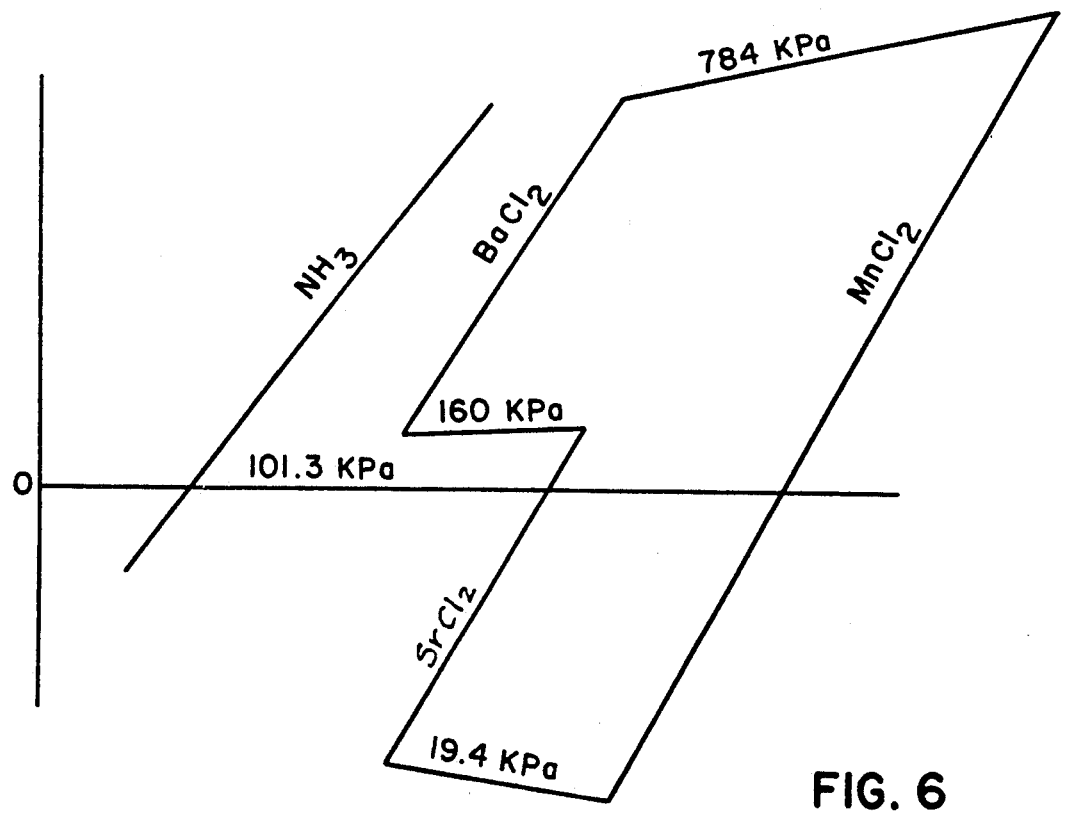
FIG. 6

# ROTARY TRISORPTION HEAT PUMP

BACKGROUND ART

Thermally activated heat pumps based on the absorption principle hold great promise for meeting the combined environmental goals of higher energy efficiency (reduced $CO_2$ emissions) and zero ozone depletion for space conditioning applications. However, the joint achievement of high efficiency, simplicity, and low cost has proved to be elusive. The traditional single-effect cycles, although reasonably simple, are not efficient enough. The more efficient LiBr double-effect cycle requires a separate source of cooling water and cannot be used for winter heat pumping. Various other proposed high efficiency cycles suffer from one or more of various disadvantageous requirements:

high head low flow pump(s);
high head low flow throttling device(s);
flow splitters;
internal sorbent-to-sorbent heat exchange;
separate heat transfer loops with pump(s) and/or complex valving arrangements;
high pressure liquid seals at moving joints; and
high generator temperatures.

The use of solid sorbents in single-effect intermittent cycle heat pumps or refrigerators is well known. Solid sorbent use presents the advantages that no sorbent or refrigerant pumps or valves are required (in certain configurations) and the sorbent is reasonably well localized. There are, however, many disadvantages: high latent heat of sorption causes very low coefficient of performance (COP); achieving continuous heat flow requires multiple units connected via complex valving arrangements; the heat release rate tends to be highly uneven, and that coupled with the periodic requirement to change between absorb and desorb results in substantial idle or lightly loaded periods. To compensate for the light load periods, the apparatus must be highly loaded the remainder of the time, and the highly loaded periods determine the heat exchange surface requirements. An additional disadvantage for solid absorbents is their monovariant equilibrium, i.e., pressure is solely a function of temperature, and not of refrigerant (sorbate) content. Thus each solid absorbent operates at a unique lift, and if the lift requirement changes, e.g., due to varying ambient temperature, the sorbent cannot adjust. In contrast, the solid adsorbents do not have that problem, but they have the reciprocal problem that large temperature swings are required to desorb large amounts of sorbate.

Yet another problem with historical solid sorbent heat pumps was that the characteristic extreme sorbent volume changes (shrinking and swelling) caused the sorbent bed to compact and deactivate. That problem was largely overcome by additions of various inert conductive media, especially intricate porous structure such as activated carbon. Prior art disclosures of this solution are found in U.S. Pat. Nos. 2,986,525 and 4,595,774.

For direct-fired space-conditioning applications, the most severe limitation of single-effect solid sorbent intermittent cycles is the low COP. As a result, various multi-effect cycles have been proposed. Unfortunately, they have also increased complexity, by any of several mechanisms: a) sorbate valves and/or throttles; b) sorbent-to-sorbent heat exchange through two heat exchange surfaces; c) complex heat transfer loop valving; d) excessive generator temperature; and e) multiple sorbent beds are interconnected in conjunction with more sorbate than one sorbent bed can hold, which risks liquefying one of the sorbent beds at shutdown or abnormal conditions (all the sorbate migrates to the highest affinity sorbent).

Examples of disclosures of multi-effect solid sorbent heat pumps and their attendant complexities from the above list are: U.S. Pat. No. 5,083,607 (bc); U.S. Pat. No. 5,057,132 (abe), and U.S. Pat. No. 5,025,635 (abcde).

Rotary sorption heat pumps have been proposed. By arranging a multiplicity of single-effect intermittent cycle sorption heat pumps on a rotating frame, it is possible to achieve continuous heat pumping without either sorbent valves or heat transfer valves. Examples are disclosed in U.S. Pat. Nos. 4,478,057, 4,574,874, and 4,660,629.

The "trisorption" cycle is known in the prior art, although not by that name. It is the solid sorbent analog of a well-known liquid sorbent cycle. The liquid cycle has variously been referred to as the "two-stage evaporation, two-fold refrigeration effect" cycle (K. H. Richter, "Multi-Stage Absorption Refrigeration Systems", *Journal of Refrigeration*, September/October 1962, pp. (105-111) or the "double-effect condensing" cycle (J. C. V. Chinnappa, "Solar Operation of Ammonia-Water Multistage Air Conditioning Cycles in the Tropics" *Solar Energy*, Pergamon Press, Great Britain 1974, pp. (165-170). This cycle is characterized by achieving double-effect performance (input heat produces useful refrigerant two times) without need for internal heat exchange.

Hans Stymme, "Chemical Heat Pumps", Swedish Council for Building Research, S2:1982, Stockholm, Sweden, 1982 presents an early example of applying solid sorbents in this type of cycle. The essence is that there are three sorbents of differing affinity for the sorbate, and there is a three-stage operating cycle, each stage involving a different pair of the three sorbents in both heat and mass exchange, and each stage at a different pressure.

Uwe Rockenfeller, et al., in "Complex Compound Chemical Heat Pumps", *Proceedings of the 9th Industrial Energy Technology Conference*, Sep. 16-18, 1987, Houston, Texas, pp. 158-164 disclose that two of the trisorption heat pumps can be operated synchronously with phase separation to achieve a nearly continuous heat duty although with substantial fluctuations, using complex switching of the heat transfer media.

M. Lebrun, P. Meyer, and B. Spinner in "Coefficients de Performance de Machines a Froid Monoetagees: 0.8 a 1.6 Selon le Procede de Gestion des Chaleurs de Reaction", *Proceedings of the XVIII International Congress of Refrigeration*, Aug. 10-17, 1991, Montreal, Canada, p. 567, disclose that the low affinity media can be either a solid or simply condensed phase sorbate, and that the latter generally yields lower Coefficients of Performance.

What is needed, and a primary objective of this invention, is to simultaneously achieve the efficiency of a multi-effect cycle and the simplicity of a rotary single-effect cycle. The cycle should not require any sorbate valves, any sorbent-to-sorbent heat transfer, or any heat transfer fluid valves (other than for cooling-heating changeover). The sorbate content of each individual heat pump should be limited to positively preclude liquefaction of the sorbent. Preferably there should be no circulating heat transfer fluids beyond those inherent to the desired space conditioning function.

DISCLOSURE OF INVENTION

In its most basic aspect, this invention comprises the combination of at least one trisorption heat pump (3HP); fixed structure (e.g., conduits) for conveying heat transfer fluids; plus means for moving the 3HP relative to the fixed heat transfer structures. The 3HP is comprised of a hermetic enclosure including a sorbate and three interconnected zones of differing sorbing affinity for said sorbate. The 3HP has a three-step operating cycle wherein each of the three different pairs of sorbate affinity zones is sequentially subjected to external heat transfer, thereby causing internal mass (sorbate) transfer. The motion of the 3HP causes the sequential alignment of the different zones of sorbate affinity with the appropriate fixed heat transfer structure in the sequence of the 3HP operating cycle.

More preferably there will be multiple (at least three) 3HPs arranged as individual modules whereby at least one zone is supplying cold temperature cooling and a least one other zone is supplying moderate-temperature warming at all times, whereby continuous heat pumping operation is achieved without any pumps, valves, or control mechanisms other than the motion of said modules. This objective is attained by providing apparatus comprised of a multiplicity (at least three) of triplex sorption modules arranged on a movable frame such that they can move relative to fixed heat transfer fluid conduits. A triplex sorption module (trisorption module) is comprised of three hermetically sealed interconnected zones of differing sorbate affinity. The differing affinity is achieved either by placing a different sorbent in each zone, or by placing different sorbents in two of the zones and alternately condensing and evaporating pure sorbate in the third zone. The plurality of trisorption modules (TMs) are preferably arranged on a rotating frame such that frame rotation causes like-affinity zones of each module to follow unique paths which do not intersect the path of any unlike sorbent/affinity zone. Thereby three circular paths are defined, one for each type of zone. Each of the three circular paths is angularly segmented into at least three segments by fixed structure. The fixed structure directs heat transfer fluids into contact with the sorbate affinity zones occupying the respective segments as follows: high affinity segments: hot temperature input heat to one segment, moderate temperature discharge heat from another segment; medium affinity segments: cold temperature (cooling) heat into one segment, moderate temperature discharge heat from another segment; and low affinity segments: cold temperature (cooling) heat into one segment, moderate temperature discharge heat from another segment. Furthermore the respective segments should be located in angular relationship such that when the high affinity zone of any individual triplex heat pump module is located in the hot temperature heat input segment, its associated low affinity zone should be located in the moderate temperature heat discharge segment. Likewise when the low affinity zone of a module is located in its cold temperature (cooling) segment, the medium affinity zone of the same module should be located in the moderate temperature heat discharge segment. It will be noted that of the nine segments defined by three paths each having three segments, six of the nine are active during steady state operation: one receiving hot temperature heat; two receiving cold temperature heat (producing cooling); and three rejecting moderate temperature heat. The remaining three segments may be idle. However, a certain amount of loss in performance will be experienced if all three are idle, and it is preferred to supply waste heat to one of those segments to avoid that loss, as described later.

More particularly, the invention is defined as a heat pump comprised of (a) at least two stationary heat transfer fluid conduits with at least one for input supply of cold temperature heat and at least one for discharge of moderate temperature heat, (b) at least one trisorption module (TM) comprised of three hermetically sealed heat and mass transfer zones which are in vapor communication, one of said zones containing a high affinity sorption media; another containing a medium affinity sorption media, and the third containing one of a low affinity sorption media and sorbate condensate; (c) a means for causing motion of said TM relative to said fixed conduits along a motion path; (d) said motion path designed and dimensioned to intersect said fixed conduits in the following manner: i) said medium affinity media zone intersects said moderate temperature conduit when said low affinity media zone intersects said cold temperature conduit; and ii) said high affinity media zone intersects said moderate temperature conduit when said medium affinity media zone intersects said cold temperature conduit.

In the cooling mode the useful effect is the cold temperature heat transferred, and the moderate temperature heat is rejected to ambient. In the heating mode the cold temperature heat is transferred from some ambient source, e.g., air, water, or ground coupling, and the moderate temperature heat is supplied to the space being heated. In applications other than space conditioning, much higher or lower temperatures and other heat sources and sinks are also possible.

This invention involves three levels of temperature for the heat and three levels of affinity for the sorbate. For clarity, the three temperatures are called hot, moderate, and cold; whereas the three affinities are called high, medium, and low.

The hot temperature input heat to the high affinity zone can be via a heat transfer fluid as with the two other heat streams, using an external heat source to reheat that fluid. However, the input hot heat could also be from any other source, e.g., direct radiant flame or even radiant electric heat.

BRIEF DESCRIPTION OF THE DRAWINGS

FIG. 2(a-f) illustrates several cutaway views of a rotary trisorption heat pump (R3HP) comprised of a multiplicity of straight cylindrical trisorption modules.

FIG. 3(a-d) illustrates fixed blocking structure in the R3HP to prevent mixing of the heat transfer media.

FIG. 5 illustrates the external view of the FIG. 4 R3HP, including external heat transfer paths.

FIG. 6 illustrates the thermodynamic properties of one possible set of sorbents and refrigerant for a 3HP.

BEST MODE FOR CARRYING OUT THE INVENTION

Figure 1A:
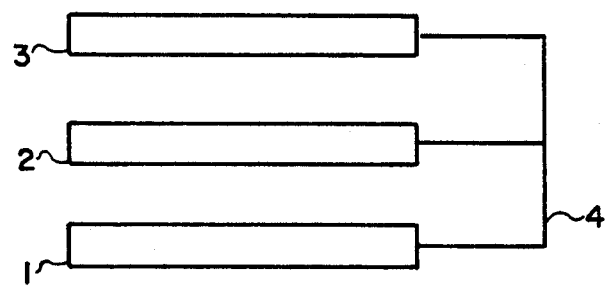
FIG. 1(a-d) illustrates a movable trisorption heat pump and its relationship to stationary heat transfer conduits during its operating cycle.
Figures 1B, 1C, 1D:
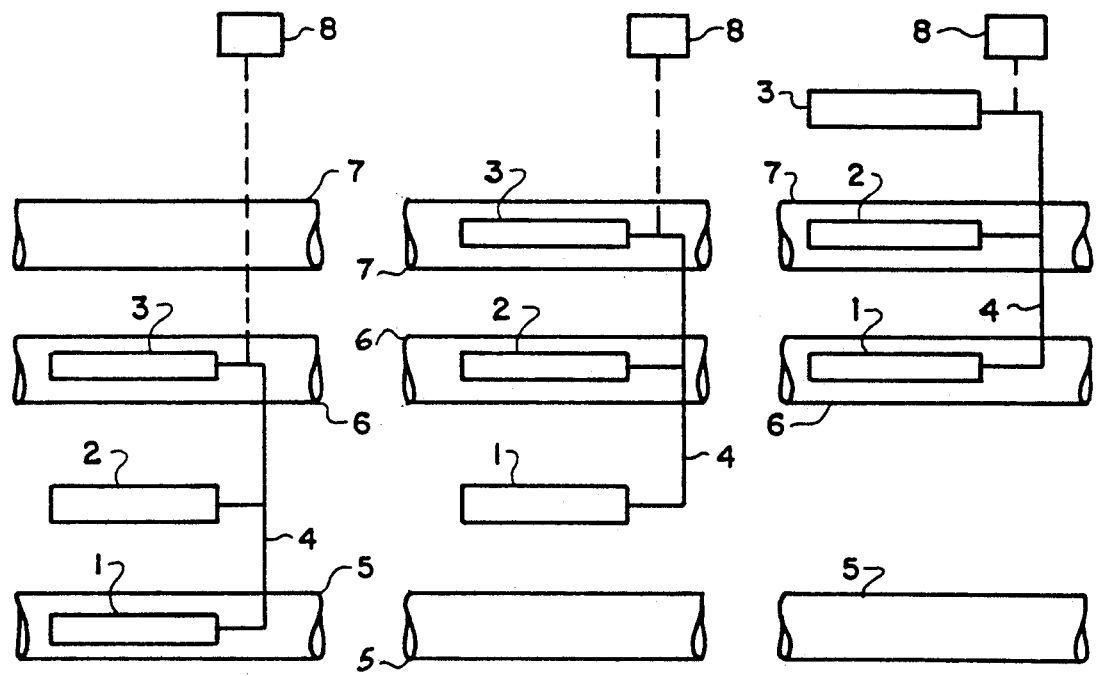

Referring to FIG. 1a, the essential hermetically sealed sorbent-containing components of a 3HP are schematically illustrated as a high affinity sorbent zone 1, a medium affinity sorbent zone 2, a low affinity sorbent zone 3, and interconnecting conduit 4 which allows gaseous sorbate to freely transfer between said zones. FIGS. 1b, 1c, and 1d also illustrate the additional components which comprise the essence of the disclosed invention: the fixed heat transfer fluid conduits (hot temperature fluid 5, moderate temperature fluid 6, and cold temperature fluid 7), plus the means for moving (8) the 3HP relative to the fixed heat transfer conduits.

FIG. 1b illustrates the stage of operation wherein hot temperature heat (5) is supplied to the high affinity zone (1); moderate temperature heat (6) is removed from the low affinity zone (3); and sorbate transfers from zone 1 to zone 3. FIG. 1c illustrates the stage of operation wherein moderate temperature heat (6) is removed from the medium affinity zone (2) and cold temperature heat (7) is supplied to the low affinity zone (3) and sorbate transfers from zone 3 to zone 2. FIG. 1d illustrates the stage of operation wherein moderate temperature heat (6) is removed from the high affinity zone (1) and cold temperature heat (7) is supplied to the medium affinity zone (2) and sorbate transfers from zone 2 to zone 1. Collectively the three FIGS. 1b, 1c, and 1d show the three stages of operation of a 3HP in the proper sequence. The means for causing motion 8 may be a linear actuator or any other known motion inducing mechanism, including the normally associated track or similar means to constrain the moving part to the desired path.

Taken individually, the three FIGS. 1b, c, and d illustrate the three stages of operation of a single 3HP. Alternatively they can be regarded jointly as illustrating the six active zones of heat and mass transfer normally present in a configuration comprised of three 3HPs.

Whereas FIG. 1 illustrates the essential features of the invention, it entails some practical difficulties. A start-stop motion is required, rather than continuous motion. It may be difficult to permit free entry of the modules into the heat transfer conduits, and yet keep the respective heat transfer fluids isolated one from another to avoid heat leaks. When multiple modules are present, each may require its own driving mechanism. All of these potential problems are avoided by the apparatus configuration illustrated in FIG. 2.

In FIG. 2a is shown a very simple version of the trisorption module (TM): a cylindrical pipe divided into three segments (21, 22, and 23) respectively containing the high, medium, and low affinity sorbent. The empty portions of the pipe 24 form the sorbate conduits. When the external heat transfer fluid is a gas such as air, it is preferred to have enhanced heat transfer surface 32 such as fins at each sorption zone. Also, to facilitate internal sorbate vapor transport, one or more vapor passageways 29 may be present in the sorbents. In the event the low affinity zone is comprised of sorbate condensate, there will preferably be a wick 30 which encourages any liquid present to establish maximum contact with the pipe wall, and also a weir 31 which prevents escape of liquid to the other zones.

FIG. 2b is a perspective view of how six of the FIG. 2a TMs would be mounted in a cylindrical frame. Mounting bulkheads 34 and 33 are affixed to the TMs at the sorbate conduit locations 24, and also serve to prevent mixing of the heat transfer fluids supplied to the respective zones. Longitudinal baffles 35 are inserted between the TMs, and they also prevent heat transfer fluid mixing.

The bulkheads 34 and 33 can provide the bearing surface for rotation in a stationary circular track (not shown); drive motor 28 and rotating pinion 27 provide the motive force for the entire assembly (6 TMs, 34, 33, and 35) to rotate. Bulkheads would also normally be present at each end of the rotating assembly, but are not shown for clarity.

FIGS. 2c, 2d, and 2e are cross-sectional views of the three sections of the rotating assembly (respectively high, medium, and low affinity sections), plus also the associated fixed heat transfer structure for each section. The six TM high affinity sections 21a-f are mounted in bulkhead 33 and are separated by baffles 35. Fixed heat transfer structure 36 supplies hot temperature heat to the TMs adjacent it, in this case 21e and 21f. Fixed heat transfer conduit 37 removes moderate temperature heat from its adjacent modules, 21c and 21d. Inside fixed baffle 38 prevents mixing of the hot and moderate temperature fluids.

In FIG. 2d, the medium affinity zones 22a-f are shown mounted in bulkhead 34 and separated by longitudinal baffles 35. Fixed heat transfer structure 39 supplies fluid which removes moderate temperature heat from zones 22a and 22b. Fixed heat transfer structure 40 supplies fluid which supplies cold temperature heat to zones 22c and 22d. That heat causes sorbate to desorb from 22c and 22d, and absorb into 21c and 21d, producing the moderate temperature heat which is removed there. Internal fixed structure 41 prevents mixing of the moderate and cold temperature fluids.

In FIG. 2e, the low affinity zones 23a-f are mounted in bulkhead 42, and separated by baffles 35. Fixed heat transfer structure 43 supplies cold heat transfer fluid which delivers cold temperature heat to zones 23a and 23b, in which sorbate is evaporated (desorbed) and transferred respectively to zones 22a and 22b for absorption and release of moderate temperature heat. Fixed heat transfer structure 44 supplies heat transfer fluid which removes moderate temperature heat from zones 23e and 23f, which are respectively absorbing sorbate from zones 21e and 21f. Fixed internal baffle 45 prevents mixing of the moderate and cold temperature fluids.

With the fixed heat transfer structure arranged as shown in FIGS. 2c, 2d, and 2e, the proper direction of rotation of the rotating part is clockwise. As zone 21f becomes fully desorbed due to hot heat supply and zone 23f correspondingly becomes loaded with condensate due to moderate temperature heat removal, TM "f" rotates into the "a" position. In the "a" and subsequent "b" position, the sorbate in each module fully transfers from zone 23 to zone 22. As rotation continues into the "c" and then "d" position, sorbate fully transfers from zone 22 to zone 21. Finally the cycle is completed by rotation into "e" and then "f" positions, with sorbate again transferring from zone 21 to zone 23.

The fixed internal baffles 38, 41, and 45 form an integral structure extending all the way through the rotating assembly. As illustrated in FIG. 2f, they incorporate fixed bulkheads 46 and 47 which are respectively adjacent to rotating bulkheads 34 and 33. Bulkheads 46 and 47 may comprise part or all of the track which guides the motion of the rotating apparatus, and at the minimum they should minimize unwanted fluid transfer across the bulkhead by a sliding seal or similar means.

In the apparatus as illustrated by FIG. 2, several different flow paths of the heat transfer fluid (e.g., air) are possible Cooling air (air to be cooled) is provided in two segments, via structures 40 and 43. Warming air (moderate temperature) is provided from three segments, via fixed structures 37, 39, and 44. The segments of each type can be arranged for either series or parallel air flow. The series arrangement entails additional pressure drop penalty, but as will be described later it can provide significant thermodynamic benefit via increased temperature driving forces. Considering FIG. 2e, the cooling air in conduit 43 can be routed in through zone 23a, changed in direction by internal baffle 45, and then routed out through zone 23b to another portion of conduit 43. With all the other segments similarly configured, this provides parallel inter-segment routing. The intra-segment routing can be either parallel or series. Alternatively, part of the cooling air can be supplied to 43 and routed in through both zones 23a and zone 23b, and then exit longitudinally along baffle 45 out the end of the rotating assembly. The remainder is supplied to 40 and routed in through both zones 22c and 22d, then mixes with the other cooling air via an opening in bulkhead 47. Here the routing is parallel both inter- and intra- segment.

Series intersegment routing is accomplished by strategically located holes in bulkheads 46 and 47 which allow passage of air between like-temperature zones. For example, cold air from structure 43 passes in parallel across 23a and 23b, then through a flowpath in bulkhead 47 (hole 25), then out through 22c and 22d into structure 40. For the moderate temperature air, one possible series intersegment flow path would be enter via structure 37 and in through zones 21c and 21d, through bulkhead 46, out through zones 22a and 22b to structure 39, thence through connecting conduit to structure 44, in through zones 23e and 23f, and finally exit longitudinally along one side of baffle 45. Clearly a great deal of flexibility is possible in achieving desired air flow paths.

The rotary trisorption heat pump (R3HP) as illustrated in FIG. 2 has a potential problem of mixing of the different temperature heat transfer fluids as illustrated in FIG. 3a. FIG. 3a illustrates the FIG. 2e configuration after the rotating assembly has rotated 1/12th of a full revolution. When a module (23f) spans two different fixed heat transfer conduit structure (43 and 44), it allows wasteful mixing of the two associated air streams. In order to prevent that mixing, it is necessary to have blocking structure one cell wide between the two fixed structure 43 and 44. A cell is the width of one TM and its adjacent baffles 35. Similarly, air can escape from modules 23d and 23b unless there is blocking structure there.

Since the module(s) adjacent the blocking structure are idle at least part of the time, it is necessary to add more TMs to have six active TMs at all times. Note that it is also necessary to have blocking structure one cell wide between fixed structure 36 and 37, and also between fixed structure 39 and 40.

FIGS. 3b–3d illustrate the apparatus of FIGS. 2c–2e as modified to add the required six blocking structures (48-53) and three additional TMs. Dependent upon which TMs are adjacent the six blocking structures at any point in time, this configuration part of the time has three of its nine TMs idle. The need for three idle cells is dictated by the angular separation of the six blocking structures. It is noted that whereas the idle segments (21b and 21c of FIG. 3b) strictly speaking do not require fixed blocking shrouds, it is convenient to include them there also, as illustrated at components 52, 53, and 54. It is also noted that fixed components 38, 41, and 45 have internal blocking structure adjacent to external blocking structures 48-53.

Whereas adding three TMs to a six-TM installation to prevent mixing would seem a significant penalty, for the more typical R3HP having tens or hundreds of TMs it is not significant. Although seals are preferably present between the stationary members and the rotating assembly, when air is the heat transfer media they needn't be very tight.

Figure 4A:
FIG. 4(a-e) illustrates a R3HP comprised of offset branched TMs, providing improved flowpaths for the heat transfer media.
Figure 4B:
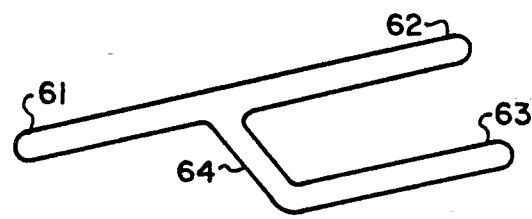
Figure 4C:
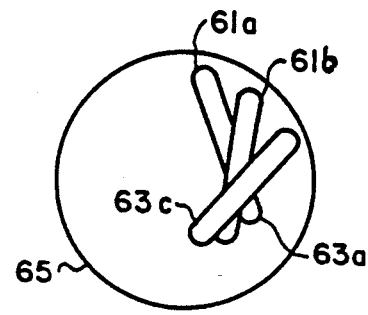
Figure 4D:
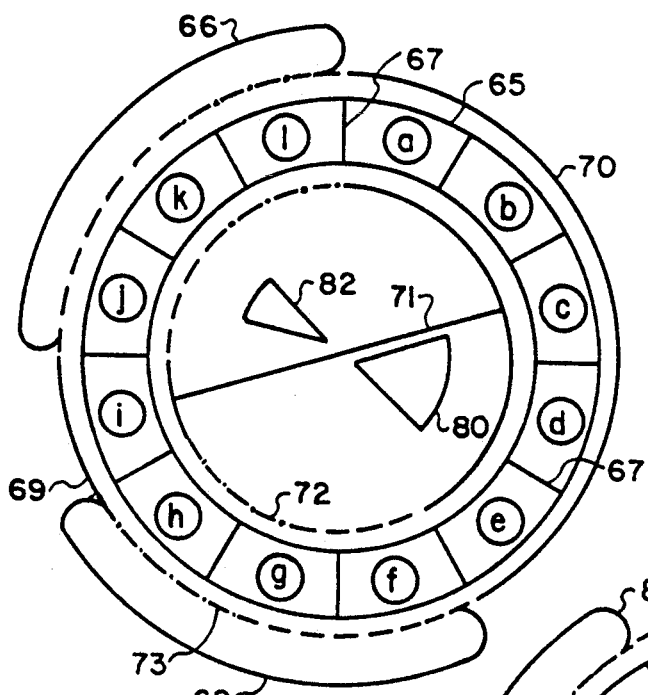
Figure 4E:
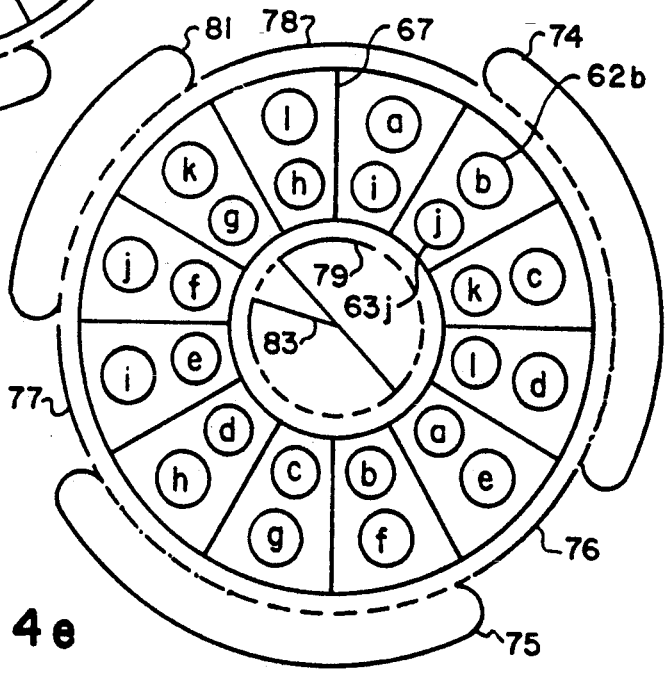

Especially when air or another gas is used as the heat transfer media, the pressure drop across the TMs and through the interconnecting ducting is a concern. It will be apparent that the TMs can have geometries other than the simple straight cylinder of FIG. 2a. FIG. 4a illustrates one alternative geometry—a branched cylinder. FIG. 4b illustrates a further modification—the offset branched cylinder—which can result in a simpler rotating assembly and fixed structure with less pressure drop. The low affinity zone 63 and the medium affinity zone 62 are angularly offset by approximately 120°. The vapor conduit 64 accomplishes the offset. FIG. 4c is an end view, showing how three offset branched TMs (a, b, and c) would be mounted in rotating bulkhead 65. FIGS. 4d and 4e are cross-sectional views of the two sides of a rotating assembly comprised of 12 offset branched TMs, with the high affinity media side shown in FIG. 4d. Note that the effect of the branch is that only one separating bulkhead 65 is required. The offset provides the advantage that all of the cold temperature zones are in the same angular segment (63b through 63d and 62f through 62h); and two-thirds of the moderate temperature zones are in the same angular segment (63j through 63l and 62b through 62d).

In FIG. 4d, the fixed structure for hot temperature heat addition 66 is depicted adjacent to the high affinity media zones of TMs j, k, and l, with each TM being separated from its neighbor by insulating partition 67. Fixed structure 68 for moderate temperature heat transfer fluid is adjacent TMs f, g, and h. Fixed external blocking structures 69 and 70, and also fixed internal blocking structure 71, prevent mixing or escape of the heat transfer media The open portions (flow passage portions) of the fixed structures may be fitted with screens, filters, or means for flow regulation, as indicated by 72 and 73.

When the high affinity media zones are rotated to the FIG. 4d orientation, the attached medium and low affinity zones will be oriented as shown in FIG. 4e. Fixed structure for moderate temperature heat removal 74 will be adjacent medium affinity media zones 62b, c, and d, and also low affinity media zones 63j, k, and l. Refrigerant vapor desorbed from the heat addition at zones 61j, k, and l will be absorbed or condensed in 63j, k, and l due to heat removal there. Correspondingly, cold temperature heat supplied via fixed structure 75 causes desorption (or evaporation) from zones 63b, c, and d, and concurrent absorption in zones 62b, c, and d due to the moderate temperature heat removal there. Similarly, desorption from zones 62f, g, and h is associated with the absorption in zones 61f, g, and h in FIG. 4d. Fixed external blocking structures 76, 77, 78, and fixed internal blocking structure 79, prevent mixing or escape of the cold and moderate temperature heat transfer media.

FIGS. 4d and 4e illustrate two optional features. First is the hole 80 which allows internal communication of the moderate temperature air routed through fixed structure 68 with that routed through fixed structure 74. For example, the routing path could be in at conduit 68, in across zones 61f, g, and h, through hole 80, out across zones 63j, k, l, and then zones 62b, c, d, and finally exit via conduit 74. Or, the entire path could be reversed.

The second optional feature is provided by fixed heat transfer exhaust conduit 81 plus hole 82 and longitudinal bulkhead 83, the latter two jointly defining a third fixed space in the interior of FIG. 4e which communicates with the hot temperature fixed space in the interior of FIG. 4d. The purpose of this additional structure is to route part or all of the hot temperature fluid from conduit 66 which has already heated zones 61j, k, and l, through 82, and then out through zones 63 f and g, 62j and k, and finally exit at conduit 81. In effect this supplies waste heat to warm zone 62 from its cold temperature to a temperature intermediate to the moderate and high temperatures. This is desirable because otherwise zone 62j would preferentially absorb gaseous refrigerant from zone 61j until it reaches that intermediate temperature, and only then would zone 63j start condensing (or absorbing if a solid media is the low affinity media). Thus applying the waste heat in this fashion provides two benefits—it avoids a sensible heat loss and it avoids wastefully using part of the latent heat capacity of zone 62. In addition, the resulting colder exhaust can thereby extract more heat from a combustion gas when that is the primary heating source. This principle is beneficial to all trisorption heat pumps, whether moving, rotary, or stationary: it is beneficial to provide waste heat or other heating source to the medium affinity media concurrent with or just before the start of heat addition to the high affinity media.

One characteristic of solid sorbents is that the sorption kinetics are highly nonlinear—both absorption and desorption (plus their associated heat effects) occur much faster at the start than later in the cycle. This is because the most accessible molecular sorption sites having best thermal paths tend to react first. It would be thermodynamically desirable to supply heat transfer media at a higher rate to the modules which are in the faster kinetic stages of the overall cycle. The R3HP provides a convenient means to accomplish this. The flow passage screens, e.g. 72 and/or 73, can have variable size and spacing of the openings, thereby providing greater air flow to zones which just entered the heat transfer segment (e.g., zone 61f) and lesser flow to those about to depart (zone 61h). It is noteworthy that because of the multiplicity of TMs, this very beneficial result is achieved without the disadvantage of any appreciable variation in the overall heat transfer rate or air flow rate.

FIG. 5 illustrates the external view of the FIG. 4 R3HP configuration. Prime hot temperature heat, e.g., from combustion or solar heating, heats the hot air at heat exchanger 86, and the hot air is routed to the hot temperature conduit 66, e.g., a plenum, where it is distributed across the appropriate module zones. The hot air is recycled to pick up and deliver more heat by exiting along one side of fixed partition 71, plus preferably at least some exiting via waste heat conduit (plenum) 81 and the combined streams are recirculated by hot fan 87. It is also possible to have a burner mounted directly in plenum 66, and the combustion gas directly contact the TMs. Although thermodynamically preferable, that might require special structure to prevent introducing combustion exhaust into the conditioned space in the heat pump mode.

Cold temperature air is circulated by fan 88 to enter the R3HP longitudinally and thence outward through two sets of TMs where it is further cooled. It then exits via duct/plenum 75 and is supplied to heat source 89—the conditioned space in the air conditioning mode, or the ambient (cold heat source) in the heat pump mode.

Moderate temperature heat sink 91 (the conditioned space in the heat pump mode, or the ambient in the air conditioning mode) supplies heat to conduit 92 for subsequent routing to the three zone path segments of the TMs requiring cooling. The supply to the high affinity media zones exits longitudinally along one side of fixed partition 71, and the supply to the medium and low affinity segments exits longitudinally from the other end. The combined streams are recirculated by fan 90.

The R3HP can be switched between heat pumping and air conditioning modes by interchanging the ambient and the conditioned space at locations 89 and 91, using appropriate air damper valves, or the like.

The sorbing media for a 3HP are comprised of a sorbate and two solid sorbents, when the low affinity medium is condensed sorbate, or a sorbate and three solid sorbents, when all three affinity media are solids. The various prior art disclosures of 3HP describe candidate triads of sorbing media.

The preferred sorbates are ammonia and water vapor, the former for space conditioning and refrigeration, and the latter for high temperature heat pumping. Other sorbates are possible and present advantages in certain special circumstances, e.g., hydrogen, methanol, and $CO_2$. In general, the preferred sorbates are monodentate ligands, and the preferred sorbents are those solid compounds which form coordinate covalent bonds with the ligands.

K. Speidel and H.P. Kleinemeier, "Solar Cooling and Air Conditioning Processes Using Chemical Reactions", *Solar World Congress: Proceedings of the Biennial Congress of the International Solar Energy Society, Denver, Colorado, USA*, Vol. 2, Part 1, Pergamon Press, New York, 19-23 Aug. 1991, pp. 1601-1606, present thermodynamic properties of several $NH_3$ solid sorbents. The characteristics of the 3HP, specifically the lift and the COP, are largely determined by the selection of sorbents. The table below presents preferred sorbent combinations (triads) for ammonia 3HPs. Each of the three mass exchange steps of a trisorption cycle takes place at a different pressure, and the table presents the typical temperatures associated with each step when the R3HP is supplying air conditioning.

| Sorbing Triad | Sorbing Affinity | | | Mass Exchange Temps at Pressure Step (°C.) | | | Cycle Lift °C. |
|---|---|---|---|---|---|---|---|
| | Low | Medium | High | Low | Medium | High | |
| 1 | $NH_3$ | | | | 4 | 45 | |
| | | $BaCl_2$ | | 7 | 36 | | 32 |

-continued

| Sorbing Triad | Sorbing Affinity Low | Medium | High | Mass Exchange Temps at Pressure Step (°C) Low | Medium | High | Cycle Lift °C |
|---|---|---|---|---|---|---|---|
| 2 |  |  | SrCl$_2$ | 40 |  | 104 |  |
|  | NH$_3$ |  |  |  | 7 | 44 |  |
|  |  | BaCl$_2$ |  | 4 | 38 |  | 33 |
| 3 |  |  | CaCl$_2$ | 40/46 |  | 104/111 |  |
|  | NH$_3$ |  |  |  | −7 | 43 |  |
|  |  | SrCl$_2$ |  | 10 | 60 |  | 50 |
| 4 |  |  | MnCl$_2$ | 52 |  | 152 |  |
|  | NH$_3$ |  |  |  | −7 | 49 |  |
|  |  | SrCl$_2$ |  | 10 | 60 |  | 67 |
| 5 |  |  | FeCl$_2$ | 77 |  | 191 |  |
|  | BaCl$_2$ |  |  |  | 9 | 47 |  |
|  |  | SrCl$_2$ |  | 4 | 42 |  | 38 |
| 6 |  |  | MnCl$_2$ | 46 |  | 129 |  |
|  | BaCl$_2$ |  |  | 4 |  | 46 |  |
|  |  | SrCl$_2$ |  | 9 | 38 |  | 33 |
|  |  |  | SrBr$_2$ | 42 |  | 114 |  |

For CaCl$_2$, the first temperature is for the 8 → 4 transition, and the second for the 4 → 2 transition.
R3HP is supplying air conditioning.

Sorbing triad 5 (BaCl$_2$, SrCl$_2$, MnCl$_2$) has particularly advantageous attributes for air conditioning and mild temperature heat pumping applications. It combines good temperature driving forces (cycle lift) with high COP, the latter due both to use of three solid sorbents and also to minimal sensible heat losses (low maximum temperature and large sorbate loadings). The pressure-temperature conditions of the triad 5 cycle are depicted in FIG. 6, on coordinates of RT ln P/P$_o$ ($\approx$ G$_o$)) (kcal/mole) versus T (°C.). Note that whereas only two of the sorbents are actively exchanging sorbate at each step/pressure level, all three sorbents are always at essentially equal pressures.

Using sorbing triad 5 as an example, the heat pumping (raising the temperature of heat) is done in both the low pressure step (from 4° C. to 46° C.) and the medium pressure step (9° C. to 42° C.). The two lifts are different, and the cycle lift is the average of the two. By proper routing of the heat transfer media, it is possible to take thermodynamic advantage from this difference. The cold air being cooled can be routed across the smaller lift cooling component first (BaCl$_2$ at 9° C.), and then across the larger lift cooling component (SrCl$_2$ at 4° C). Conversely, the moderate temperature air being warmed preferably contacts the cooler media first (SrCl$_2$ at 42° C.), then the warmer (BaCl$_2$ at 47° C.). The flowpaths illustrated in FIG. 5 are so configured, thus maximizing temperature driving forces for this particular triad.

By moving multiple trisorption modules through fixed heat transfer ducts, and especially by using simple rotary motion, an exceptionally simple and efficient heat pump is achieved, yielding double-effect performance without pumps, valves or internal heat exchange, and with no heat transfer media and no heat exchange surface beyond that inherently required by the air being conditioned, plus prime heat addition.

Multiple small TMs allow each to be on the order of 1 to 5 cm in diameter, with an NH$_2$ inventory in each of tens of grams or less. Thus there is no significant safety hazard, and direct heat exchange to air without a double walled tube may well be permissible. The small diameters foster fast kinetics, so cycle times in the range of 1 to 10 minutes should be achievable, which also minimizes NH$_3$ inventory. The total ammonia inventory in each TM is limited to that amount which will fully saturate the applicable coordination sphere of the high affinity media, thus making it highly unlikely that any upset or shutdown condition could ever liquefy any of the solids.

I claim:

1. A thermally heat pump for the continuous production of at least one of heating and cooling comprised of: a plurality of trisorption modules (TM) arranged circumferentially on a frame which is adapted for rotation; each TM comprised of a hermetically sealed container for a gaseous refrigerant including at least three zones of differing affinity for said refrigerant; at least two of said zones containing solid sorbents; said TMs mounted at approximately equal spacing in said frame whereby the plurality of each of the three types of zones forms a different rotational path; fixed structure which divides each of the at least three rotational paths into at least three segments; conduits in the fixed structure for at least two of said paths which deliver one heat transfer fluid to one of said segments and a different heat transfer fluid to another segment.

2. The apparatus according to claim 1 comprised of TMs which are straight cylinders.

3. The apparatus according to claim 1 comprised of TMs which have the low affinity media zone and the medium affinity media zone angularly offset so as to bring two of said paths into angular alignment and also segmental alignment, whereby the same set of heat transfer conduits will serve the corresponding segments of both paths.

4. The apparatus according to claim 1 wherein both of said heat transfer fluids are comprised of air.

5. The apparatus according to claim 4 wherein one of said air streams is supplied to and exhausted from a conditioned space.

6. The apparatus according to claim 1 additionally comprised of a means for heat addition to said high affinity media zone comprised of at least one of direct radiant energy and direct contact with hot combustion gas.

7. The apparatus according to claim 1 additionally comprised of a hot air conduit for heat addition to said high affinity media zone, including separate means for prime heating of said hot air.

8. The apparatus according to claim 1 wherein the sorbate is selected from the list ammonia, water vapor, hydrogen, methanol, and CO$_2$.

9. The apparatus according to claim 8 wherein the sorbate is ammonia and the sorbing trials of low, medium, and high affinity media are selected from the list: $NH_3$, $BaCl_2$, $SrCl_2$; $NH_3$, $BaCl_2$, $CaCl_2$; $NH_3$, $SrCl_2$, $MnCl_2$; $NH_3$, $SrCl_2$, $FeCl_2$; $BaCl_2$, $SrCl_2$, $MnCl_2$; and $BaCl$, $SrCl_2$, $SrBr_2$.

10. The apparatus according to claim 8 wherein the sorbate is $H_2O$ and at least one of the solid sorbents is selected from the list $Na_2S$, alkaline earth halides, CaO, $Na_2SO_4$ and transition-metal compounds capable of forming coordinate covalent bonds.

11. A heat pump comprised of
 a) at least two stationary heat transfer fluid conduits:
  i) at least one for input supply of cold temperature heat; and
  ii) at least one for discharge of moderate temperature heat;
 b) at least one trisorption module (TM) comprised of three hermetically sealed heat and mass transfer zones which are in vapor communication, one of said zones containing a high affinity sorption media; another containing a medium affinity sorption media, and the third containing one of a low affinity sorption media and sorbate condensate;
 c) a means for causing motion of said TM relative to said fixed conduits along a motion path;
 d) said motion path designed and dimensioned to intersect said fixed conduits in the following manner:
  i) said medium affinity media zone intersects said moderate temperature conduit when said low affinity media zone intersects said cold temperature conduit; and
  ii) said high affinity media zone intersects said moderate temperature conduit when said medium affinity media zone intersects said cold temperature conduit.

12. Apparatus according to claim 11 additionally comprised of a means for supplying hot temperature heat to said high affinity media zone when said low affinity media zone intersects said moderate temperature conduit.

13. Apparatus according to claim 12, including at least two TMs with motion paths displace such that during operation at least one TM is at all times in position of either step 11 *d*) i) or 11 *d*) ii) whereby cooling is continuously produced.

14. Apparatus according to claim 13 wherein said means for causing motion is comprised of a rotatable frame comprised of circumferentially spaced mountings for said plurality of TMs plus a means for causing rotation of said frame.

15. Apparatus according to claim 12 additionally comprised of a means for supplying waste heat at a temperature hotter than said moderate temperature to said medium affinity sorption media.

16. A process for increasing the temperature of a quantity of heat from a cold temperature to a moderate temperature comprising operating at least one trisorption module (TM) comprised of a high affinity media, a medium affinity media, and a zone of low refrigerant affinity, through its operating cycle comprised of a high pressure step, medium pressure step, and and low pressure step, characterized by supplying heat at a temperature higher than said moderate temperature to said medium affinity media during the transition from said low pressure step to said high pressure step.

17. The process according to claim 16 additionally comprising providing a multiplicity of TMS and a rotatable mounting and fixed heat transfer media paths and rotating said mounting plus 3HPs so as to intersect said fixed paths.

18. A process for space conditioning, comprising sequencing a multiplicity of TMS in a repeating pattern such that each in turn commences and then completes each of the three mass exchange steps comprising the trisorption heat pump operating cycle; and wherein at least one of said three steps has at least two of said TMS in that step during process operation; characterized by: supplying a greater flow rate of heat transfer media to the TM commencing said step than the flow rate that is supplied to the TM completing said step.

19. The process according to claim 18 additionally comprising mounting said multiplicity of TMS in a frame and rotating said frame and intersecting portions of the TMS mounted in said frame with fixed heat transfer media flowpaths.

20. The process according to claim 19 additionally comprising routing a cold heat transfer medium in contact with the cold sorbents of said, TMS in sequential order of decreasing temperature.

21. A process for increasing the temperature of a quantity of heat from a first temperature to a second temperature higher than the first comprising rotating a multiplicity of sorption modules (SMs) so as to intersect fixed heat transfer media paths, each SM comprised of a high affinity sorption media, a medium affinity sorption media, a sorbate, and a zone of low affinity for said sorbate.

* * * * *